United States Patent [19]

Kumasaka

[11] Patent Number: 4,983,815
[45] Date of Patent: Jan. 8, 1991

[54] METHOD OF IDENTIFYING STAMPER FOR OPTICAL INFORMATION STORAGE DISK

[75] Inventor: Osamu Kumasaka, Yamanashi, Japan
[73] Assignee: Pioneer Electronic Corporation, Tokyo, Japan
[21] Appl. No.: 381,459
[22] Filed: Jul. 18, 1989
[30] Foreign Application Priority Data Feb. 17, 1989 [JP] Japan ............................ 1-37744

[51] Int. Cl.$^5$ .................................... G06F 15/46
[52] U.S. Cl. ................................ 235/376; 235/462; 235/487
[58] Field of Search .................. 235/462, 487, 376
[56] References Cited

U.S. PATENT DOCUMENTS 4,166,574 9/1979 Yokoyama ................ 235/487 X
4,677,604 6/1987 Selby et al. ................ 235/462 X
4,825,093 4/1989 Kiriseko et al. .............. 235/462 X Primary Examiner—David Trafton
Attorney, Agent, or Firm—Perman & Green

[57] ABSTRACT

There is disclosed a method of identifying a stamper for an optical information storage disk in order to distinguish first and second stampers from each other, the second stamper being replicated from the first stamper, each of the first and second stampers carrying recorded information signals and a printed code pattern recorded circumferentially and representing stamper identifying information from each other. The printed code pattern is read in a predetermined direction, and it is determined whether a start or stop signal of the printed code pattern is read first. The first and the second stampers are distinguished from each other in dependence on whether the start or stop signal is read first.

2 Claims, 3 Drawing Sheets

METHOD OF IDENTIFYING STAMPER FOR OPTICAL INFORMATION STORAGE DISK

BANKGROUND OF THE INVENTION

1. Field of the Invention

The present invention relates to a method of identifying a stamper for an optical information storage disk, which stamper bears a printed code pattern such as a bar code pattern, a Calra code pattern, or the like.

2. Discription of the Prior Art

Stampers for optical information storage disks are manufactured as follows: A photoresist 2 is coated on a glass substrate 1, and then exposed to a laser beam which is applied by an exposure recording device and that is turned on and off by a signal to be recorded. Then, the pattern recorded on the photoresist 2 by the laser beam is developed to form pits 3 as shown in FIG. 4(A) of the accompanying drawings. The glass substrate 1 with the pits 3 is used as a glass master. Then, an electrically conductive layer 4 is applied to the glass master by sputtering or the like, as shown in FIG. 4(B), and a metal layer is electroformed on the conductive layer 4. The electroformed metal layer and the conductive layer 4 are peeled off as a master stamper 5 as shown in FIG. 4(C). The suface of the master stamper 5 is passivated, and then a metal layer is electroformed thereon as shown in FIG. 4(D). The electroformed metal layer is peeled off, thus forming a submaster stamper 6 as shown in FIG. 4(E). The surface of the submaster stamper 6 is passivated, and a metal layer is electroformed thereon as shown in FIG. 4(F). The electroformed metal layer is then peeled off as a baby stamper 7 as shown in FIG. 4(G).

If recorded signals are the same, then it is difficult to distinguish the master stamper, the submaster stamper, and the baby stamper from each other simply by looking at these stampers. It has been customary to distinguish these stampers by manually marking the stampers as they are fabricated, or measuring the sizes of these stampers (the master, submaster, and baby stampers are progressively smaller in diameter by 2 to 10 mm in that order).

The conventional stamper identifying processes have however been time-consuming and prevented the stamper manufacturing procedure from being automatized since the stamper identification has required manual labor.

SUMMARY OF THE INVENTION

It is an object of the present invention to provide a method of identifying disk stampers which allows easy disk stamper identification and can automatize a stamper identification process.

According to the present invention, there is provided a method of identifying a stamper for an optical information storage disk in order to distinguish first and second stampers from each other, the second stamper being replicated from the first stamper, each of the first and second stampers carrying recorded information signals and a printed code recorded circumferentially and representing stamper identifying information from each other, the method comprising the steps of reading the printed code in a predetermined direction, determining whether a start or stop signal of the printed code is read first, and distinguishing the first and the second stampers from each other depending on whether the start or stop signal is read first.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
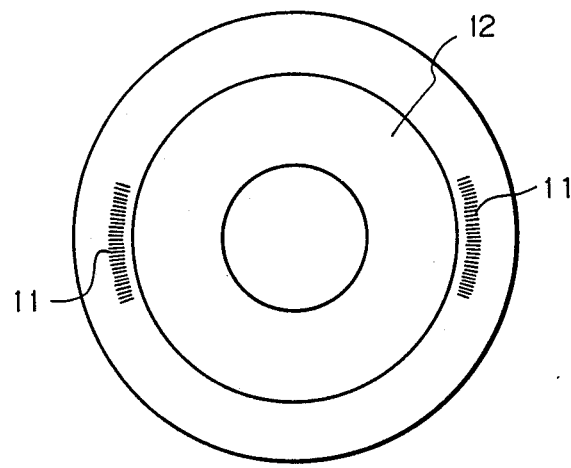
FIG. 1 is a plan view showing positions where bar codes are recorded on an information storage disk.

FIG. 1 shows positions where at least one bar code pattern, i.e., printed code pattern carrying information for identifying an information storage disk stamper, is recorded on an information storage disk. The bar code pattern, indicated at 11, is recorded at a non-storage area inside or outside, of a signal storage area 12 of the information storage disk. The bar code pattern 11 extends in a circumferential direction such as a clockwise direction. The bar code pattern can be recorded, together with signals to be recorded, on the glass master through exposure to the recording laser beam. Therefore, these bar code pattern is also recorded on the master stamper, the submaster stamper, and the baby stamper. It is to be noted that the bar code patterns formed on the submaster stamper and those on the master stamper and the baby stamper are arranged in the opposite directions. The bar code pattern may be formed by directly irradiating a laser beam on the master stamper.

Figure 2:
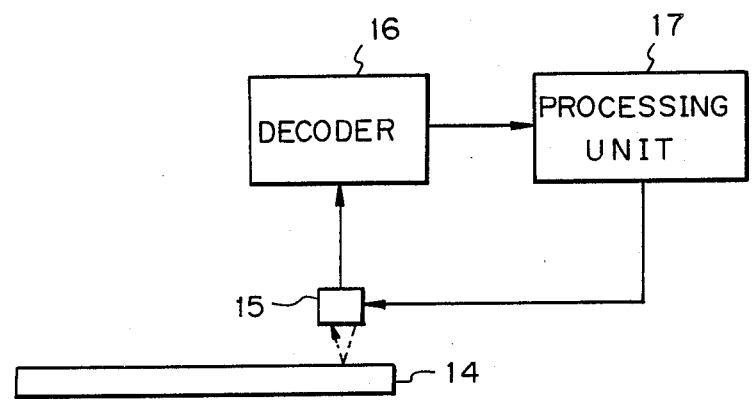
FIG. 2 is a block diagram of a bar code reading system incorporating a stamper identifying method according to the present invention.

FIG. 2 shows a bar code reading system incorporating a stamper identifying method according to the present invention. A bar code recorded on a stamper 14 is read by a bar code reader 15, and then supplied as a bar code signal from the bar code reader 15 to a decoder 16. The decoder 16 then decodes the bar code signals into serial data signals composed of one byte of plural pits. The serial data signals are supplied from the decoder 16 to a processing unit 17. The processing unit 17 is in the form of a microcomputer comprising a processor, an input/output interface, a RAM, and a ROM, and effects control in each processing step of the stamper manufacturing process. For example, the processing unit 17 controls the bar code reading system to determine what type of stamper the stamper 14 is when the stamper 14 has been delivered to a certain position.

Figure 3:
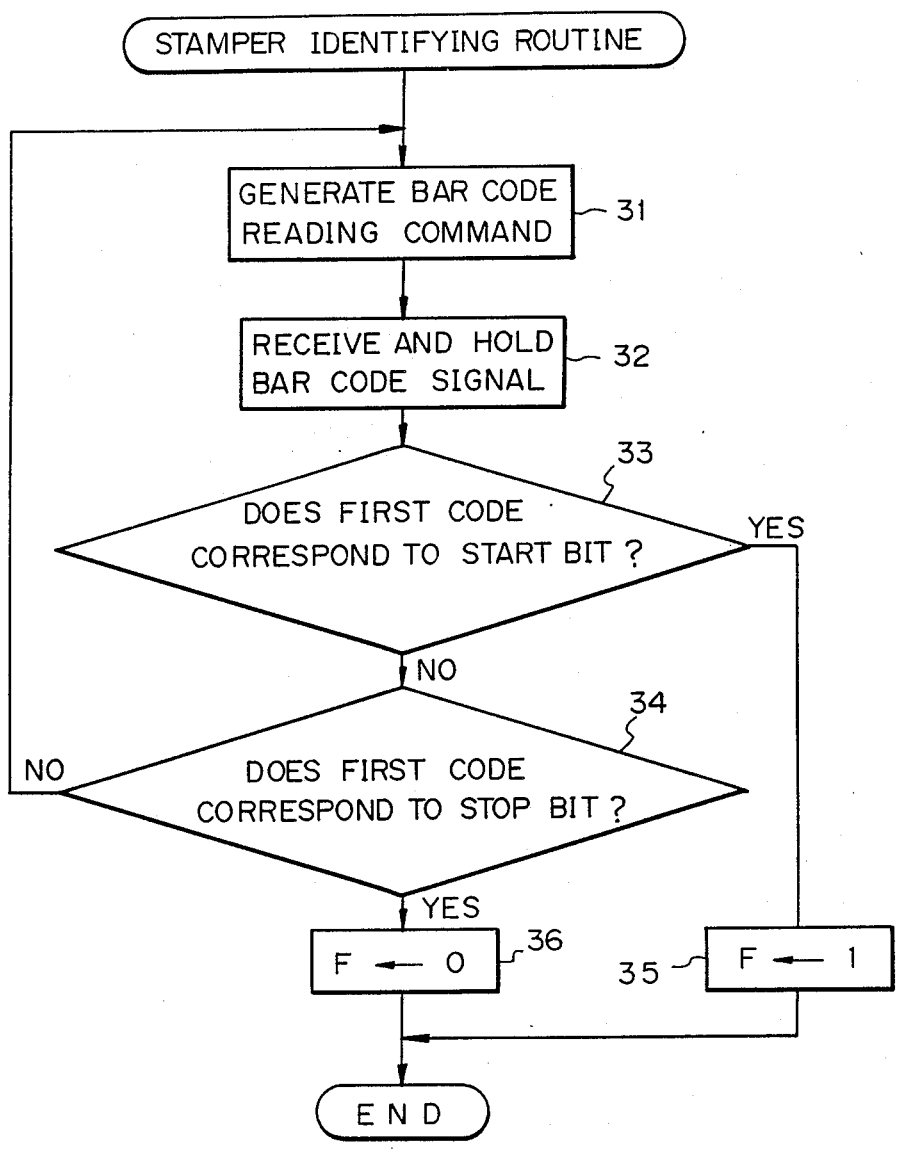
FIG. 3 is a flowchart of a sequence of operation of the bar code reader shown in FIG. 2.
Figure 4A:
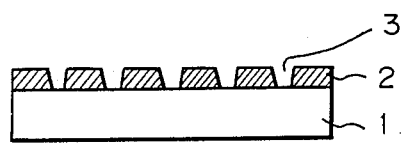
FIGS. 4(A) through 4(G) are fragmentary cross-sectional views showing a process of manufacturing stampers.
Figure 4B:
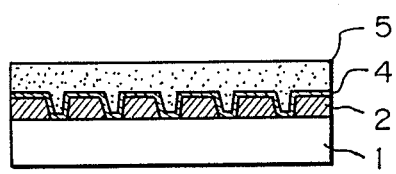
Figure 4C:
Figure 4D:
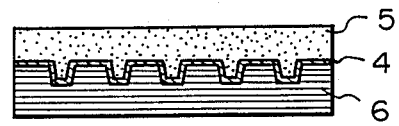
Figure 4E:
Figure 4F:
Figure 4G:
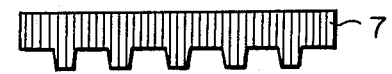

When the stamper 14 reaches the certain position, the processing unit 17 executes the stamper identifying routine shown in FIG. 3. More specifically, the processing unit 17 applies a command for reading the bar code on the stamper 14 to the bar code reader 15 in a step 31. Then, the bar code reader 15 reads the bar code on the stamper 14 in a predetermined direction, and generates a succession of bar code signal pulses. The bar code signal pulses are decoded by the decoder 16 into serial data signals which is supplied to the processing unit 17.

When the serial data signals are fed to the processing unit 17, the processing unit 17 successively receive and hold them in a buffer (not shown) therein in a step 32. The processing unit 17 then determined whether the first code data of the serial code signals correspond to a start bit or not in a step 33, and a stop bit or not in a step 34. More specifically, a start bit is formed at one of the opposite end of the bar code, and a stop bit is formed at the other end of the bar code, with necessary bar code information written between these start and stop bits. The bar codes on the master and baby stampers and the submaster stampers extend in the opposite directions, as described above. Therefore, when the bar code is read in one direction by the bar code reader 15, it is read from the stop bit on the master and baby stampers, but from the start bit on the submaster stamper.

If the first code data of the serial data signals correspond to the start bit in the step 33, then a flag is set to "1" in a step 35 to indicate that the stamper 14 is a submaster stamper. If the first code data of the serial data signals correspond to the stop bit in the step 34, then a flag is reset to "0" in a step 36 to indicate that the stamper 14 is a master stamper or a baby stamper. After the stamper identifying routine, subsequent operation is carried out depending on the flag F, e.g., a protective film is coated on the master stamper and the baby stamper.

If the first code data do not correspond to either the start bit or the stop bit in the steps 33, 34, then the bar code has not been read properly, and hence the bar code is read again in the step 31.

In the above embodiment, the bar codes are printed or recorded on the stamper 14. However, the method of the present invention is also applicable to stampers bearing other printed codes such as a Calra code.

In the above embodiment, the decoder 16 only decodes the bar code signal to serial data signals. However, the decoder 16 may be arranged to effect the above stamper identifying process, and the processing unit 17 may be arranged to carry out stamper fabricating operation depending on the identification of the stamper effected by the decoder 16.

While the bar code reader 15 is controlled by the processing unit 17 to move over the stamper 14 for reading the bar code in the above embodiment, the bar code reader 15 may be fixed, and the stamper 14 may be moved to allow the bar code reader 15 to read the bar code.

With the present invention, as described above, a printed code such as a bar code on a stamper is read in a predetermined direction, and it is determined whether a start or stop signal of the printed code is read first. Accordingly, the master and baby stampers or the submaster stamper can automatically be identified in a short period of time without manual intervention. Consequently, a stamper manufacturing process can easily be automatized.

Although a certain preferred embodiment has been shown and discribed, it should be understood that many changes and modifications may be made therein without departing from the scope of the appended claims.

What is claimed is:

1. A method of identifying a stamper for an optical information storage disk in order to distinguish first and second stampers from each other, the second stamper being replicated from the first stamper, each of the first and second stampers carrying recorded information signals and at least one printed code pattern recorded circumferentially and representing stamper identifying information from each other, said method comprising the steps of:
    reading the printed code pattern in a predetermined direction;
    determining whether a start or stop signal of the printed code is read first; and
    distinguishing the first and the second stampers from each other depending on whether the start or stop signal is read first.

2. A method according to claim 1, wherein said predetermined direction is a clockwise or counterclockwise circumferential direction of said disk.

* * * * *